(12) United States Patent
Kasazumi et al.

(10) Patent No.: US 10,642,032 B2
(45) Date of Patent: May 5, 2020

(54) HEAD-UP DISPLAY

(71) Applicant: Panasonic Intellectual Property Management Co., Ltd., Osaka (JP)

(72) Inventors: Ken'ichi Kasazumi, Osaka (JP); Toshiya Mori, Osaka (JP); Hiroaki Okayama, Nara (JP); Satoshi Kuzuhara, Osaka (JP); Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

(21) Appl. No.: 16/026,109

(22) Filed: Jul. 3, 2018

(65) Prior Publication Data

US 2018/0314064 A1    Nov. 1, 2018

Related U.S. Application Data

(63) Continuation of application No. PCT/JP2016/005048, filed on Dec. 2, 2016.

(30) Foreign Application Priority Data

Jan. 20, 2016    (JP) .................. 2016-009292

(51) Int. Cl.
*G02B 27/01*    (2006.01)
*B60K 35/00*    (2006.01)
(Continued)

(52) U.S. Cl.
CPC .......... *G02B 27/0101* (2013.01); *B60K 35/00* (2013.01); *G02B 3/08* (2013.01);
(Continued)

(58) Field of Classification Search
CPC ...... G02B 27/0101; G02B 30/54; G02B 3/08; G02B 5/003; B60K 35/00
(Continued)

(56) References Cited

U.S. PATENT DOCUMENTS 7,530,712 B2 * 5/2009 Lin ..................... F21V 7/0008
362/247
10,544,918 B2 * 1/2020 Fujikawa ............. C08G 59/226
(Continued)

FOREIGN PATENT DOCUMENTS

JP    9-218465    8/1997
JP    2013-137442    7/2013
(Continued)

OTHER PUBLICATIONS

International Search Report of PCT application No. PCT/JP2016/005048 dated Feb. 14, 2017.

*Primary Examiner* — Fred Tzeng
(74) *Attorney, Agent, or Firm* — Greenblum & Bernstein, P.L.C.

(57) ABSTRACT

A head-up display includes an optical system that radiates light forming a projected image toward an eye box. The eye box is a predetermined range in which eyes of an observer are assumed to be present. The optical system includes a Fresnel lens having a bumpy surface having a sawtooth-shaped cross-section. The bumpy surface is formed concentrically around an optical axis, and formed by alternately disposing first surfaces as light condensing surfaces that allow incident light to converge toward a focal point, and second surfaces as wall surfaces that do not allow the incident light to converge toward the focal point. The second surfaces are inclined with respect to the optical axis of the
(Continued)

Fresnel lens at an angle to reflect the incident light striking the wall surfaces, in a direction toward outside of a range of the eye box.

5 Claims, 12 Drawing Sheets

(51) Int. Cl.
  *G02B 3/08* (2006.01)
  *G02B 5/00* (2006.01)
  *G02B 30/54* (2020.01)

(52) U.S. Cl.
  CPC ............ *G02B 5/003* (2013.01); *G02B 30/54* (2020.01); *B60K 2370/1529* (2019.05); *B60K 2370/23* (2019.05); *B60K 2370/334* (2019.05); *B60Y 2400/92* (2013.01); *G02B 2027/011* (2013.01); *G02B 2027/0118* (2013.01); *G02B 2027/0127* (2013.01); *G02B 2027/0136* (2013.01); *G02B 2027/0185* (2013.01)

(58) Field of Classification Search
  USPC .......................................................... 345/7
  See application file for complete search history.

(56) References Cited

U.S. PATENT DOCUMENTS

| | | | | |
|---|---|---|---|---|
| 2005/0094294 | A1* | 5/2005 | Wada | G02B 3/08 359/811 |
| 2009/0147363 | A1* | 6/2009 | Murata | B29D 11/0073 359/576 |
| 2009/0323502 | A1* | 12/2009 | Murata | B29D 11/00269 369/112.03 |
| 2010/0135130 | A1* | 6/2010 | Hamano | G11B 7/1353 369/44.32 |
| 2013/0208508 | A1* | 8/2013 | Nichol | G02B 6/0013 362/612 |
| 2016/0218479 | A1* | 7/2016 | Weigand | H01S 3/094019 |
| 2016/0327792 | A1* | 11/2016 | Matsushita | B60K 35/00 |
| 2017/0092169 | A1* | 3/2017 | Kuzuhara | G09G 3/007 |

FOREIGN PATENT DOCUMENTS

| | | |
|---|---|---|
| JP | 2014-043205 | 3/2014 |
| JP | 2014-191285 | 10/2014 |
| JP | 2015-184432 | 10/2015 |

* cited by examiner

FIG. 10
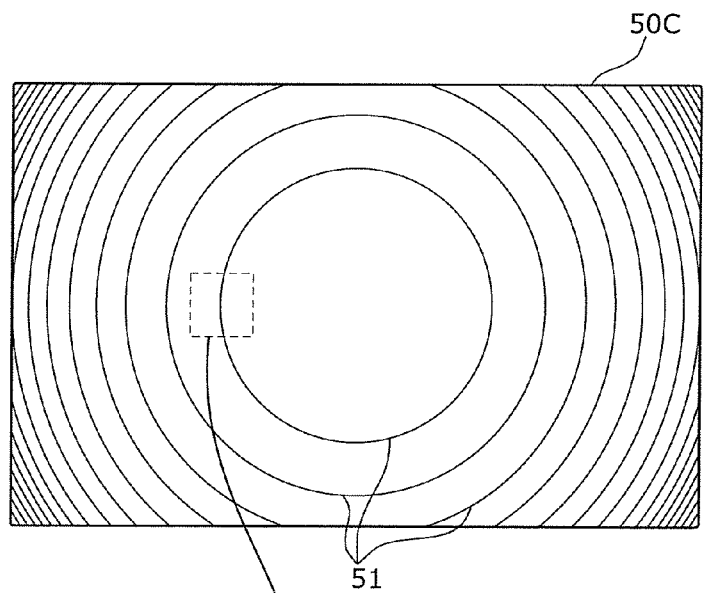
(a)
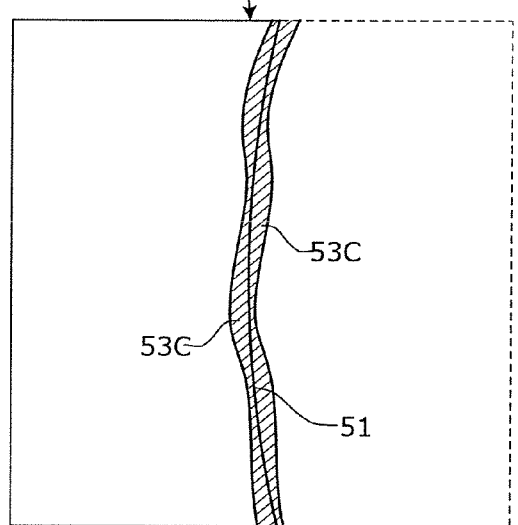
(b)

HEAD-UP DISPLAY

CROSS-REFERENCE TO RELATED APPLICATIONS

This application is a continuation of the PCT International Application No. PCT/JP2016/005048 filed on Dec. 2, 2016, which claims the benefit of foreign priority of Japanese patent application No. 2016-009292 filed on Jan. 20, 2016, the contents all of which are incorporated herein by reference.

BACKGROUND

1. Technical Field

The present disclosure relates to a head-up display.

2. Description of the Related Art

As a display device for displaying an image, for example, a head-up display (HUD) for a vehicle has been known (see, for example, Japanese Patent Unexamined Publication No. 2014-43205; hereinafter referred as PTL 1). The head-up display uses a so-called augmented reality (AR), and displays a virtual image of an image which is formed on a movable screen, in space in front of a windshield of a vehicle. This can allow a driver to view information about driving (for example, car navigation information) superimposed on a scene in front of the windshield.

SUMMARY

The present disclosure provides a head-up display capable of reducing the deterioration of image quality.

A head-up display in accordance with one aspect of the present disclosure includes an optical system that radiates light forming a projected image toward an eye box. The eye box is a predetermined range in which eyes of an observer are assumed to be present. The optical system includes a Fresnel lens having a bumpy surface having a sawtooth-shaped cross-section. The bumpy surface is formed concentrically around an optical axis, and formed by alternately disposing light condensing surfaces that allow incident light to converge toward a focal point, and wall surfaces that do not allow the incident light to converge toward the focal point. Each of the wall surfaces is inclined with respect to the optical axis of the Fresnel lens at an angle to the incident reflect light striking each of the wall surfaces, in a direction toward outside of a range of the eye box.

A head-up display of another aspect of the present disclosure includes an optical system that radiates light forming a projected image toward an eye box. The eye box is a predetermined range in which eyes of an observer are assumed to be present. The optical system includes a Fresnel lens having a bumpy surface having a sawtooth-shaped cross-section. The bumpy surface is formed concentrically around an optical axis, and formed by alternately disposing light condensing surfaces that allow incident light to converge to a focal point, and wall surfaces that do not allow the incident light to converge toward the focal point. Each of the wall surfaces is inclined with respect to the optical axis of the Fresnel lens at an angle such that the incident light on the Fresnel lens does not directly strike each of the wall surfaces.

The head-up display of the present disclosure is capable of reducing the deterioration of image quality.

BRIEF DESCRIPTION OF DRAWINGS

FIG. 10 is a plan view of a Fresnel lens seen from a direction of an optical axis in accordance with modified example 3 of the first exemplary embodiment.

DETAILED DESCRIPTION OF PREFERRED EMBODIMENTS

Findings Underlying the Present Disclosure

Figure 1:
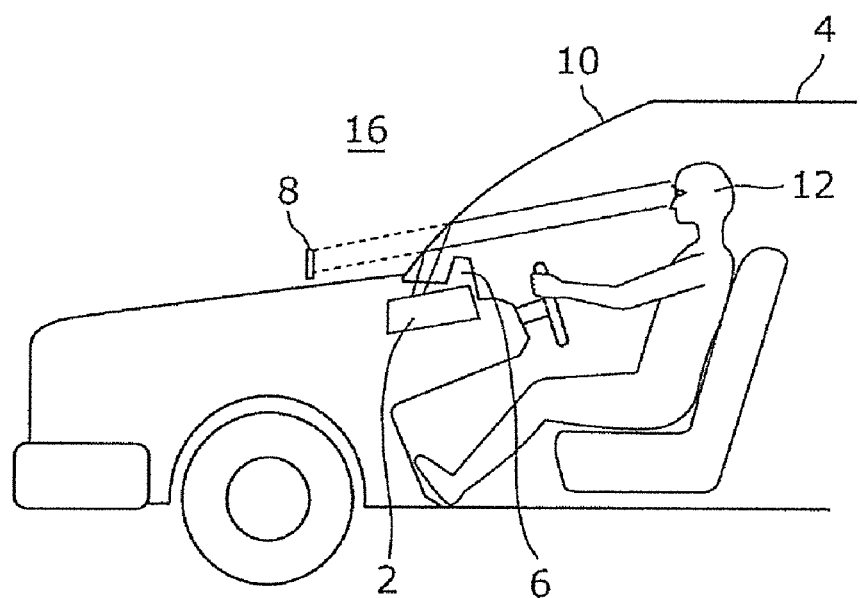
FIG. 1 is a view showing an example of use of a head-up display in accordance with a first exemplary embodiment.

The present inventors have found that the following problem arises in the technology described in the section of "BACKGROUND".

The head-up display of PTL 1 uses a Fresnel lens for a video-based optical system (for example, an eyepiece optical system). In the head-up display of PTL 1, since concentric circular stray light is generated due to scattered light and reflected light in the step shape of the Fresnel lens, and the stray light is overlaid on the image, thus deteriorating the image quality.

In order to solve such a problem, the head-up display in accordance with one aspect of the present disclosure includes an optical system that radiates light forming a projected image toward an eye box. The eye box is a predetermined range in which eyes of an observer are assumed to be present. The optical system includes a Fresnel lens having a bumpy surface having a sawtooth-shaped cross-section. The bumpy surface is formed concentrically around an optical axis, and formed by alternately disposing light condensing surfaces that allow incident light to converge toward a focal point, and wall surfaces that do not allow the incident light to converge toward the focal point. Each of the wall surfaces is formed to be inclined with respect to the optical axis of the Fresnel lens at an angle to reflect the incident light striking each of the wall surfaces, in a direction toward outside of a range of the eye box.

According to this aspect, among incident light, a portion of the incident light reflected by each of the wall surfaces that does not allow the incident light to converge toward the focal point is emitted in a direction toward outside of a range of the eye box, and therefore can be prevented from being visually recognized by the observer. Furthermore, among the incident light, the other portion of the incident light that is not reflected by the wall surfaces can be emitted in a direction toward the inside of the range of the eye box, and therefore can be visually recognized by a driver. Therefore, it is possible to effectively reduce visual recognition of stray light by a driver caused by reflection by the wall surfaces. Therefore, it is possible to effectively reduce deterioration of an image displayed by the head-up display.

Furthermore, among a plurality of the wall surfaces that form the bumpy surface, a second wall surface disposed outside a first wall surface may be inclined with respect to the optical axis greater than the first wall surface is.

Furthermore, a head-up display in accordance with another aspect of the present disclosure includes an optical system that radiates light forming a projected image toward an eye box. The eye box is a predetermined range in which eyes of an observer are assumed to be present. The optical system includes a Fresnel lens having a bumpy surface having a sawtooth-shaped cross-section. The bumpy surface is formed concentrically around an optical axis, and formed by alternately disposing light condensing surfaces that allow the incident light to converge to a focal point, and wall surfaces that do not allow the incident light to converge toward the focal point. Each of the wall surfaces is inclined with respect to the optical axis of the Fresnel lens at an angle such that the incident light on the Fresnel lens does not directly strike each of the wall surfaces.

Furthermore, the light condensing surfaces and the wall surfaces may be respectively disposed to be overlapped with each other in a direction of the optical axis.

Furthermore, the head-up display further includes a light source that emits light, a scanner that performs scanning with the light from the light source, and a screen through which light from the scanner passes to form an image on the screen. The optical system may display a virtual image of the image formed on the screen, in space.

Hereinafter, the exemplary embodiments are specifically described with reference to drawings.

Note here that embodiments described below show a generic or specific example. The numerical values, shapes, materials, constituent elements, the arrangement and connection of the constituent elements, steps, the order of the steps, etc. shown in the following embodiments are examples, and therefore do not intend to limit the present disclosure. Furthermore, among the constituent elements in the following embodiments, constituent elements not recited in an independent claim indicating the broadest concept are described as arbitrary constituent elements.

First Exemplary Embodiment 1-1. Schematic Configuration of Head-Up Display

Figure 2:
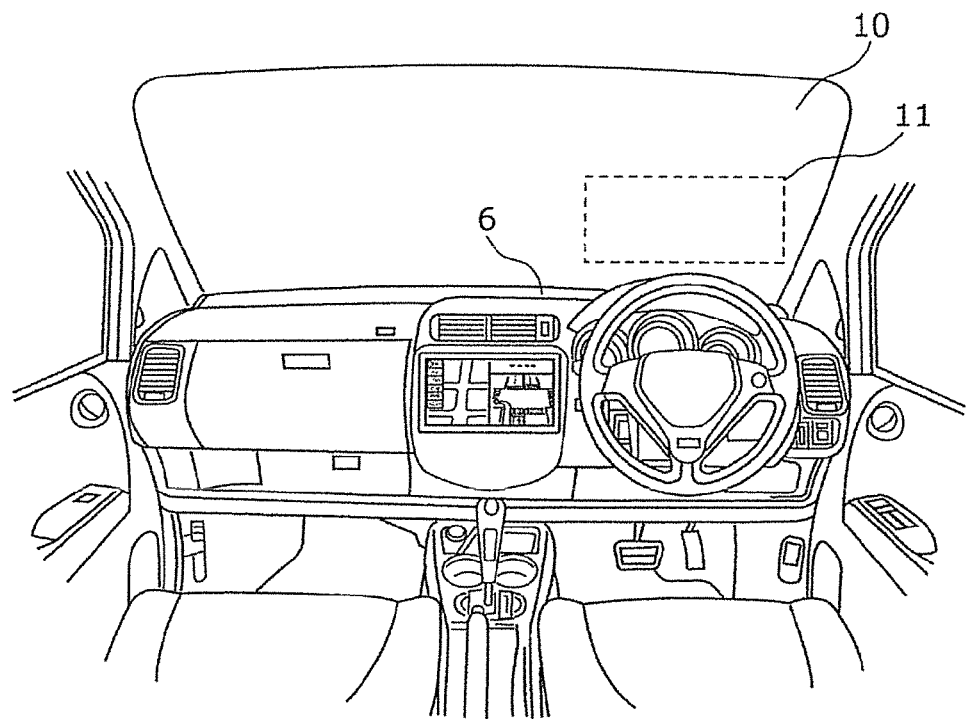
FIG. 2 is a view showing a region of an image displayed by the head-up display in accordance with the first exemplary embodiment.
Figure 3:
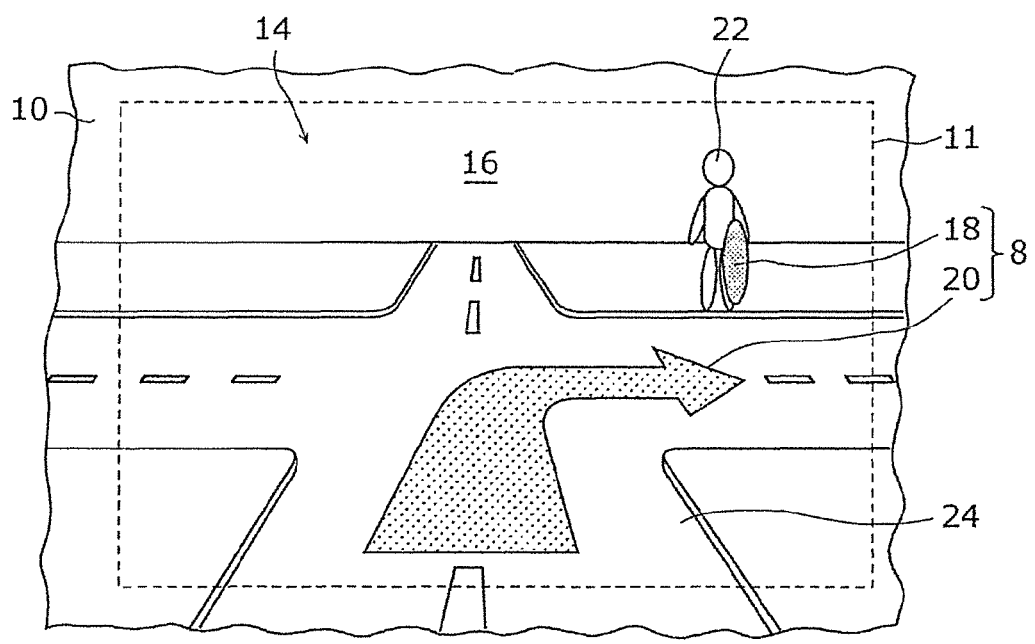
FIG. 3 is a view showing an example of an image displayed by the head-up display in accordance with the first exemplary embodiment.

Firstly, with reference to FIGS. 1 to 3, a schematic configuration of head-up display 2 in accordance with a first exemplary embodiment is described. FIG. 1 is a view showing an example of use of head-up display 2 in accordance with the first exemplary embodiment. FIG. 2 is a view showing region 11 of image 8 displayed by head-up display 2 in accordance with the first exemplary embodiment. FIG. 3 is a view showing an example of image 8 displayed by head-up display 2 in accordance with the first exemplary embodiment.

As shown in FIG. 1, head-up display 2 in accordance with the first exemplary embodiment is, for example, a head-up display for a vehicle, and is disposed in dashboard 6 of automobile 4 (an example of a vehicle).

As shown in FIGS. 1 and 2, head-up display 2 projects laser light (an example of light) for displaying image 8 that is an virtual image toward, for example, region 11 at a lower part and at a driver's seat side in windshield 10 of automobile 4, and allows the laser light to be reflected at windshield 10 toward driver 12. This enables driver 12 to view image 8 that is the virtual image to be superimposed on scene 14 in front of windshield 10, as shown in FIG. 3. In other words, head-up display 2 displays (projects) image 8 that is the virtual image in space 16 in front of windshield 10.

In an example shown in FIG. 3, image 8 displayed by head-up display 2 includes vertical image 18 and depth image 20. Vertical image 18 is a virtual image displayed in a vertical direction (up-and-down direction in FIG. 1) in space 16 in front of windshield 10. Vertical image 18 is, for example, a mark having a substantially elliptical shape that is vertically long, and is displayed to be overlaid on pedestrian 22 that is present in front of automobile 4. This allows driver 12 to easily notice the presence of pedestrian 22.

Meanwhile, depth image 20 is a virtual image displayed in a depth direction (right-and-left direction in FIG. 1) that is a direction intersecting the vertical direction in space 16 in front of windshield 10. Depth image 20 is, for example, an arrow for guiding a traveling route to a destination (an arrow for instructing to turn right at the intersection, in an example in FIG. 3), and is displayed to be overlaid on road 24 that is present in front of automobile 4. This allows driver 12 to easily know the traveling route to the destination.

1-2. Specific Configuration of Head-Up Display

Figure 4:
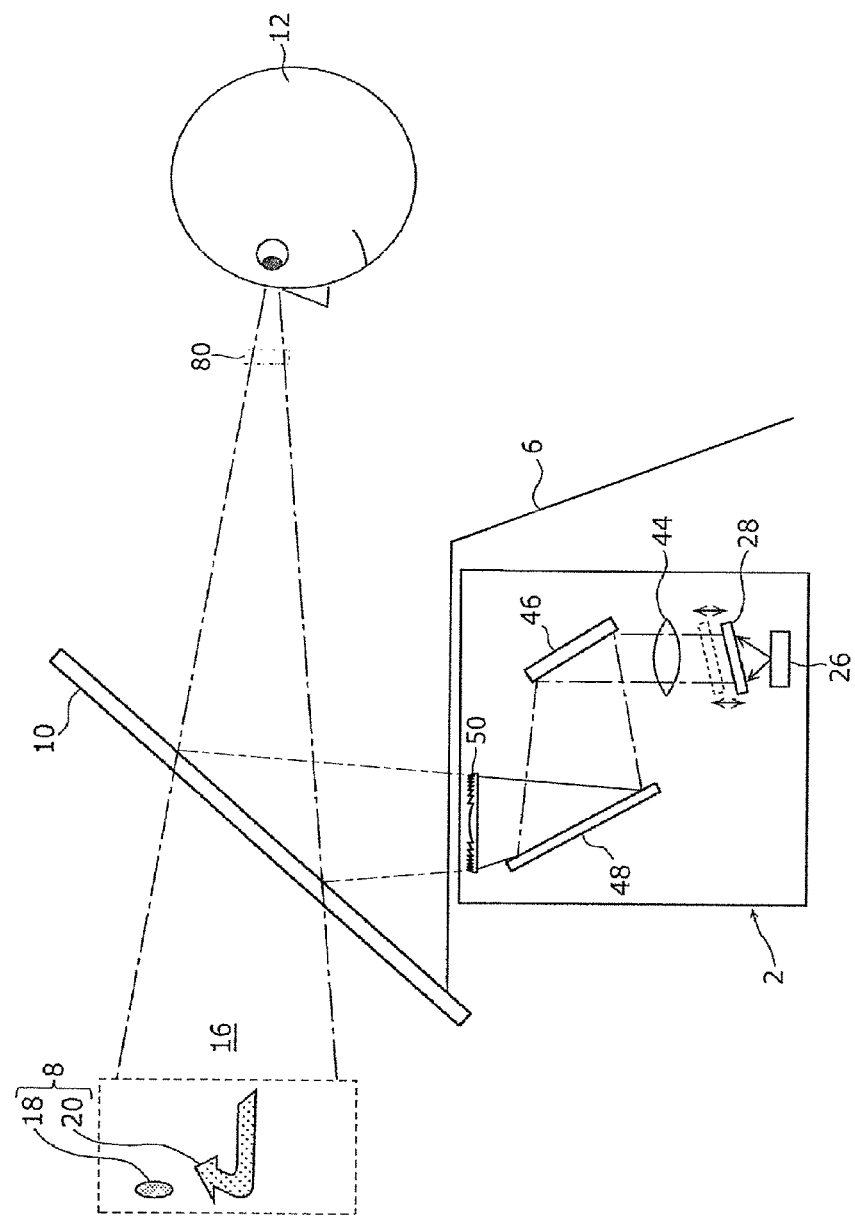
FIG. 4 is a view showing a configuration of the head-up display in accordance with the first exemplary embodiment.
Figure 5:
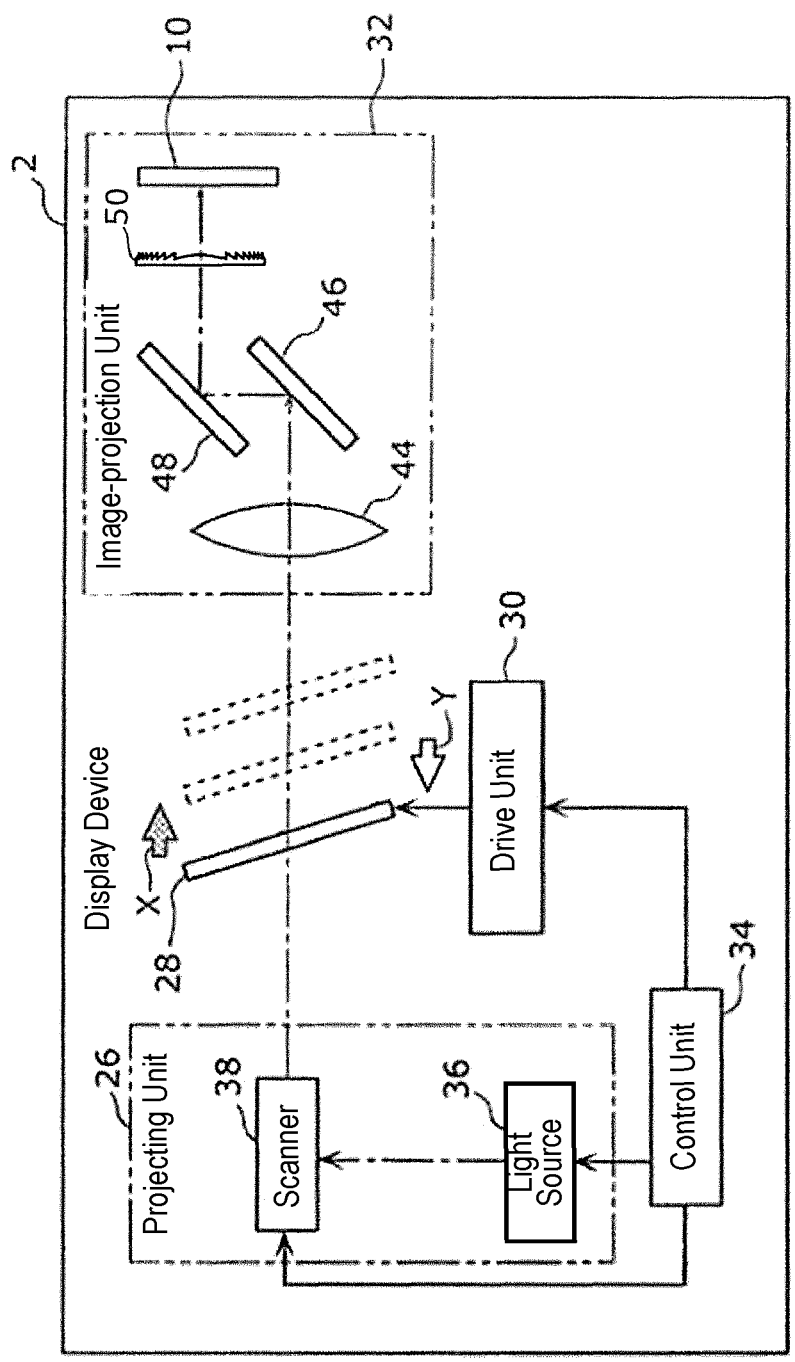
FIG. 5 is a block diagram showing a functional configuration of the head-up display in accordance with the first exemplary embodiment.

Next, specific configurations of head-up display 2 in accordance with the first exemplary embodiment are described with reference to FIGS. 4 and 5. FIG. 4 is a view showing a configuration of head-up display 2 in accordance with the first exemplary embodiment. FIG. 5 is a block diagram showing a functional configuration of head-up display 2 in accordance with the first exemplary embodiment.

As shown in FIGS. 4 and 5, head-up display 2 includes projecting unit 26, movable screen 28, drive unit 30, image-projection unit 32 (an example of the optical system), and control unit 34.

Projecting unit 26 includes light source 36 and scanner 38. Light source 36 includes a red laser diode that emits laser light having a red component (R), a green laser diode that emits laser light having a green component (G), and a blue laser diode that emits laser light having a blue component (B). The laser light having the red component, the laser light of the green component, and the laser light of the blue component, emitted from light source 36, are synthesized by, for example, a dichroic mirror (not shown) to be a synthesized laser light and then the synthesized laser light enters scanner 38.

Scanner 38 includes, for example, a micro electro mechanical system (MEMS) mirror. Scanner 38 reflects the incident laser light toward a direction corresponding to a deflection angle thereof, thereby two-dimensionally raster-scanning movable screen 28 with the laser light from light source 36. For example, scanner 38 raster-scans movable screen 28, from a first end to a second end thereof, with laser light.

Movable screen 28 is a rectangular screen having translucency (for example, semitransparency). As shown in FIG. 5, movable screen 28 is disposed so as to be capable of reciprocating in a direction apart from scanner 38 (a direction indicated by arrow X in FIG. 5 (X-direction)) and in a direction approaching scanner 38 (a direction indicated by arrow Y in FIG. 5 (Y-direction)), on an optical path of the laser light from scanner 38. Furthermore, movable screen 28 reciprocates with an attitude inclined with respect to the moving directions (X-direction and Y-direction) of movable screen 28.

The raster-scanning movable screen 28 with laser light from scanner 38 while movable screen 28 is moving in the X-direction allows an image to be formed on movable screen 28. Meanwhile, the raster-scanning movable screen 28 with laser light from scanner 38 while movable screen 28 is moving in the Y-direction, allows another image to be formed on movable screen 28. Note here that instead of movable screen 28, a fixed screen may be employed.

Drive unit 30 includes, for example, an actuator. Drive unit 30 causes movable screen 28 to reciprocate (vibrate) in the X-direction and the Y-direction at a constant frequency (for example, 60 Hz) and with constant amplitude (for example, 1 mm) based on a drive signal from control unit 34. Note here that drive unit 30 causes movable screen 28 to reciprocate such that a period of time during which movable screen 28 moves in the X-direction (or the Y-direction) is, for example, 25 msec or less, based on the drive signal from control unit 34.

Image-projection unit 32 includes magnifying lens 44, first reflecting plate 46, second reflecting plate 48, Fresnel lens 50, and windshield 10.

Magnifying lens 44 is disposed on the optical path of the laser light that has passed through movable screen 28. Magnifying lens 44 magnifies the image formed on movable screen 28.

First reflecting plate 46 and second reflecting plate 48 are disposed on the optical path of laser light from magnifying lens 44, and reflect the laser light from magnifying lens 44 toward windshield 10. Thus, first reflecting plate 46 and second reflecting plate 48 allow the image magnified by magnifying lens 44 to be projected on windshield 10 via Fresnel lens 50.

Fresnel lens 50 narrows a spreading angle of the image that has been magnified and spread by magnifying lens 44, thereby adjusting the image to a size within a range corresponding to eye box 80 on windshield 10 so as to be projected. Note here that eye box 80 is a predetermined range in which eyes of driver 12 (an observer) are assumed to be present.

Windshield 10 is disposed on the optical path of the laser light from Fresnel lens 50, and reflects the laser light from Fresnel lens 50 toward eye box 80. Thus, when a predetermined image is formed on movable screen 28, vertical image 18 that is a virtual image of the predetermined image is displayed in space 16 in front of windshield 10.

Control unit 34 has a function of outputting a drive signal to drive unit 30, a function of controlling a drive current supplied to light source 36, and a function of controlling a deflection angle of scanner 38. Control unit 34 includes, for example, a central processing unit (CPU), a processor, or the like, and reads and executes a computer program stored in a memory (not shown) to perform the above-mentioned functions.

1-3. Configuration of Fresnel Lens

Figure 6:
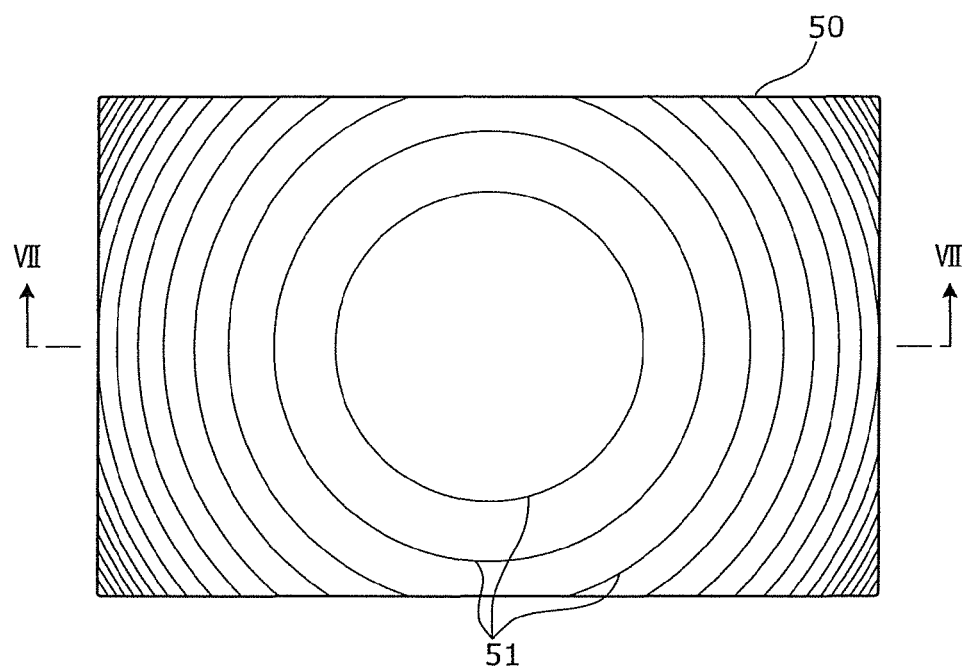
FIG. 6 is a plan view of a Fresnel lens seen from a direction of an optical axis in accordance with the first exemplary embodiment.
Figure 7:
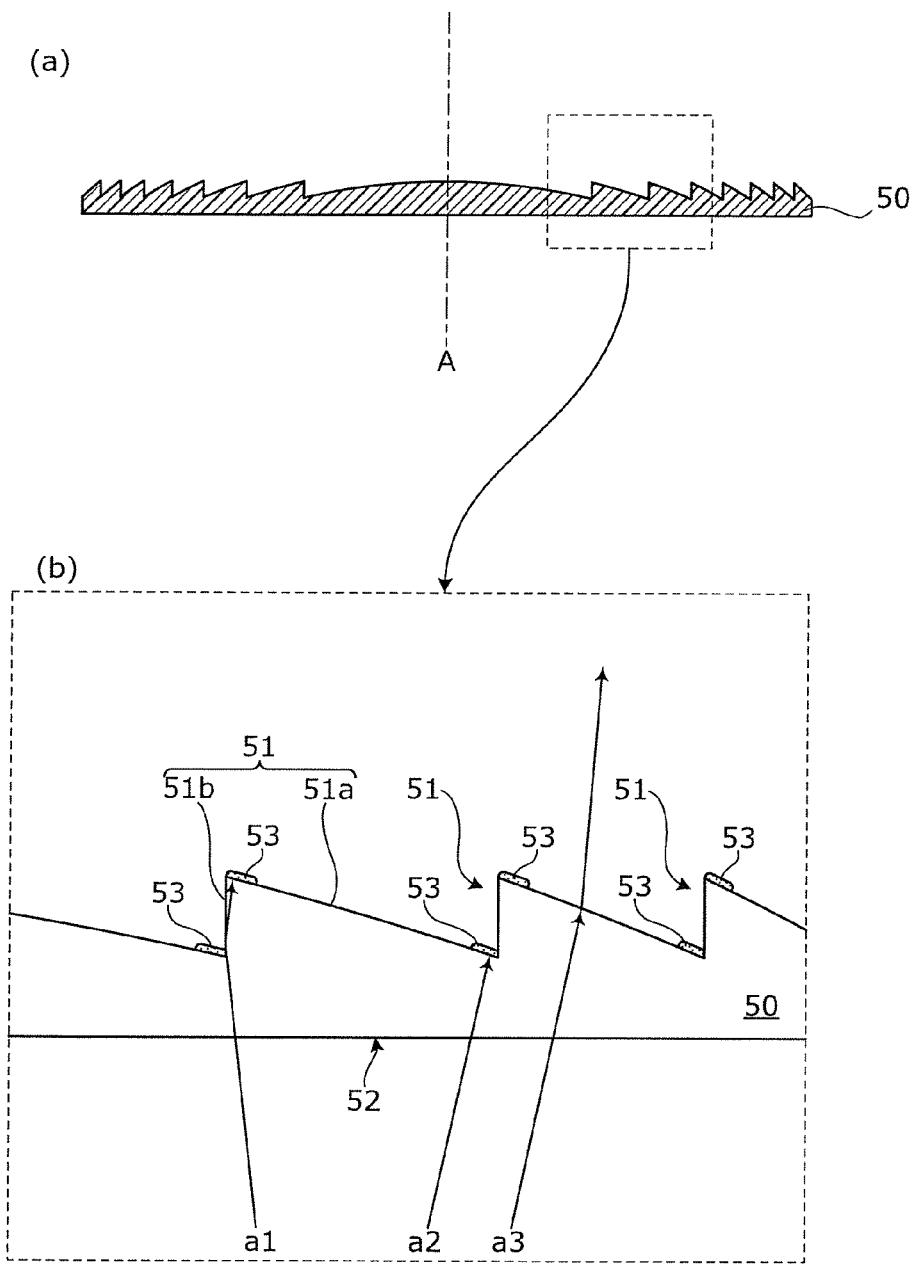
FIG. 7 is a sectional view taken on line VII-VII of FIG. 6.

Next, a specific configuration of Fresnel lens 50 in accordance with the first exemplary embodiment is described with reference to FIGS. 6 and 7. FIG. 6 is a plan view of the Fresnel lens in accordance with the first exemplary embodiment seen from a direction of the optical axis. FIG. 7 is a sectional view taken along line VII-VII of FIG. 6. Note here that FIG. 7 shows an entire sectional view of Fresnel lens 50 in (a), and a sectional view showing partially enlarged Fresnel lens 50 in (b).

As shown in FIGS. 6 and 7, Fresnel lens 50 is a rectangular plate member, and includes plane 52 disposed at a light-incident side and sawtooth-shaped bumpy surface 51 disposed at a light-emitting side. In other words, a surface at a reverse side from bumpy surface 51 of Fresnel lens 50 is plane 52. Note here that Fresnel lens 50 is made of, for example, resin such as acrylic resin. Bumpy surface 51 of Fresnel lens 50 includes first surfaces 51a inclined with respect to the optical axis A, and second surfaces 51b substantially parallel to optical axis A. First surfaces 51a and second surfaces 51b are arranged alternately. Furthermore, bumpy surface 51 is formed in a form of concentric circles as shown in FIG. 6.

Each of first surface 51a is a light condensing surface that allows light incident on Fresnel lens 50 to converge toward a predetermined focal point. In other words, first surface 51a refracts the light incident on Fresnel lens 50 toward a predetermined focal point. Furthermore, first surfaces 51a are formed concentrically. Among first surfaces 51a, the more inside (the closer to the optical axis A) first surface 51a is disposed, the larger the inclination angle of first surface 51a with respect to the optical axis A is.

Each of second surface 51b is a wall surface that does not allow light incident on Fresnel lens 50 to converge toward a predetermined focal point. Second surface 51b is a wall surface configured to offset first surface 51a that is a light condensing surface, in order to reduce a thickness of a convex lens.

In a protrusion that is formed of first surface 51a and second surface 51b being adjacent to each other and protrudes toward the emitting side, first surface 51a is disposed outside second surface 51b.

Fresnel lens 50 has light-shielding masks 53 in partial regions of first surfaces 51a where each of first surfaces 51a is adjacent to respective one of second surfaces 51b. Specifically, light-shielding mask 53 is a coating film formed by spraying paint having a light shielding property by, for example, ink-jet printing. Note here that light-shielding mask 53 is formed in a partial region of the inner side (closer to optical axis A) and in a partial region of the outer side, in first surface 51a. Light-shielding masks 53 are formed concentrically seen from the direction of the optical axis A.

1-4. Advantageous Effect

According to Fresnel lens 50 of the first exemplary embodiment, among the incident light, incident light ray a1 reflected by second surface 51b parallel to optical axis A strikes light-shielding mask 53. Incident light ray a2 strikes light-shielding mask 53 through Fresnel lens 50. Therefore, it is possible to prevent incident light rays a1, a2 from being emitted from Fresnel lens 50 to the outside. Meanwhile, among the incident light, incident light ray a3 that is not reflected by second surface 51b does not strike light-shielding mask 53, and therefore can be emitted to the outside from Fresnel lens 50. Therefore, it is possible to effectively reduce generation of stray light that is caused by reflection by second surface 51*b*.

1-5. Modified Example 1 of First Exemplary Embodiment

Fresnel lens 50 in accordance with the first exemplary embodiment mentioned above has a configuration in which light-shielding masks 53 are provided to bumpy surface 51. However, the configuration is not necessarily limited to this. Light-shielding masks 53 may be provided to plane 52.

Figure 8:
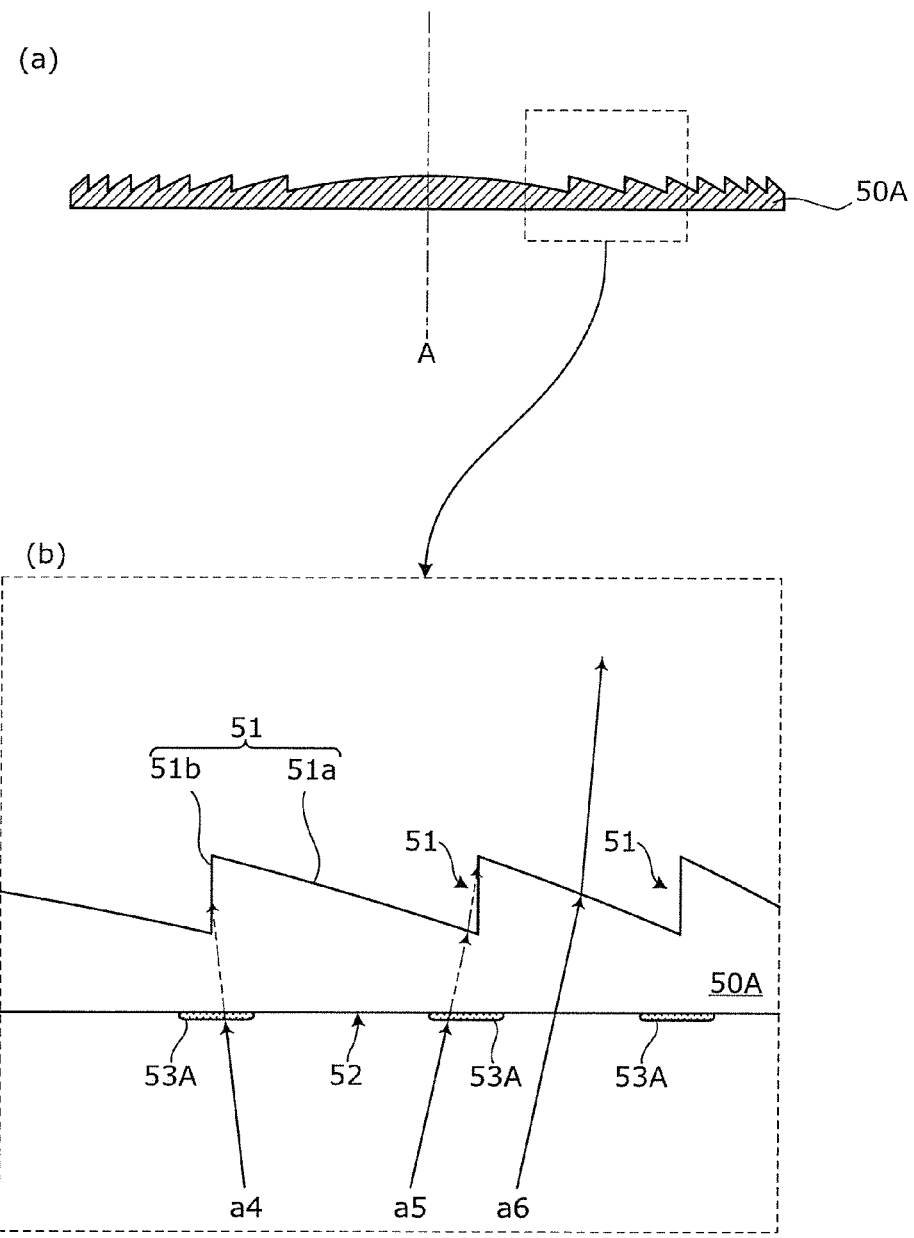
FIG. 8 is a sectional view corresponding to FIG. 7, showing a Fresnel lens in accordance with modified example 1 of the first exemplary embodiment.

A specific configuration of Fresnel lens 50A in accordance with modified example 1 of the first exemplary embodiment is described with reference to FIG. 8. FIG. 8 is a sectional view corresponding to FIG. 7, showing the Fresnel lens in accordance with the modified example 1 of the first exemplary embodiment. Note here that a configuration of Fresnel lens 50A except for light-shielding masks 53A in accordance with the modified example 1 of the first exemplary embodiment is the same as the configuration of Fresnel lens 50 except for light-shielding masks 53 in accordance with the first exemplary embodiment.

As mentioned above, Fresnel lens 50A is different from Fresnel lens 50 in the first exemplary embodiment in that light-shielding masks 53A are formed on plane 52 at the incident side of Fresnel lens 50A. In other words, each of light-shielding masks 53A is formed on plane 52 at a reverse position from second surface 51*b*. For example, as shown in (b) of FIG. 8, each of light-shielding masks 53A is formed in a region on plane 52, where light-shielding mask 53A prevents incident light ray a4 or a5 being incident on Fresnel lens 50A at an angle to be reflected by second surface 51*b* from being incident on Fresnel lens 50A. On the other hand, light-shielding masks 53A are not formed in a region on plane 52, where light ray a6, which is entering at an angle at which it is not reflected by second surface 51*b*, enters Fresnel lens 50A. In (b) of FIG. 8, paths of light rays in a case where incident light rays a4, a5 are not shielded by light-shielding masks 53A are indicated by an arrow of alternate long and two short dashes line.

Note here that a region provided with each of light-shielding masks 53A can be determined by an angle of the incident light, an angle at which the incident light is refracted at plane 52, and a shape of Fresnel lens 50A.

Note here that light-shielding masks 53A are formed concentrically seen from a direction of the optical axis A, similar to the first exemplary embodiment.

1-6. Modified Example 2 of First Exemplary Embodiment

Figure 9:
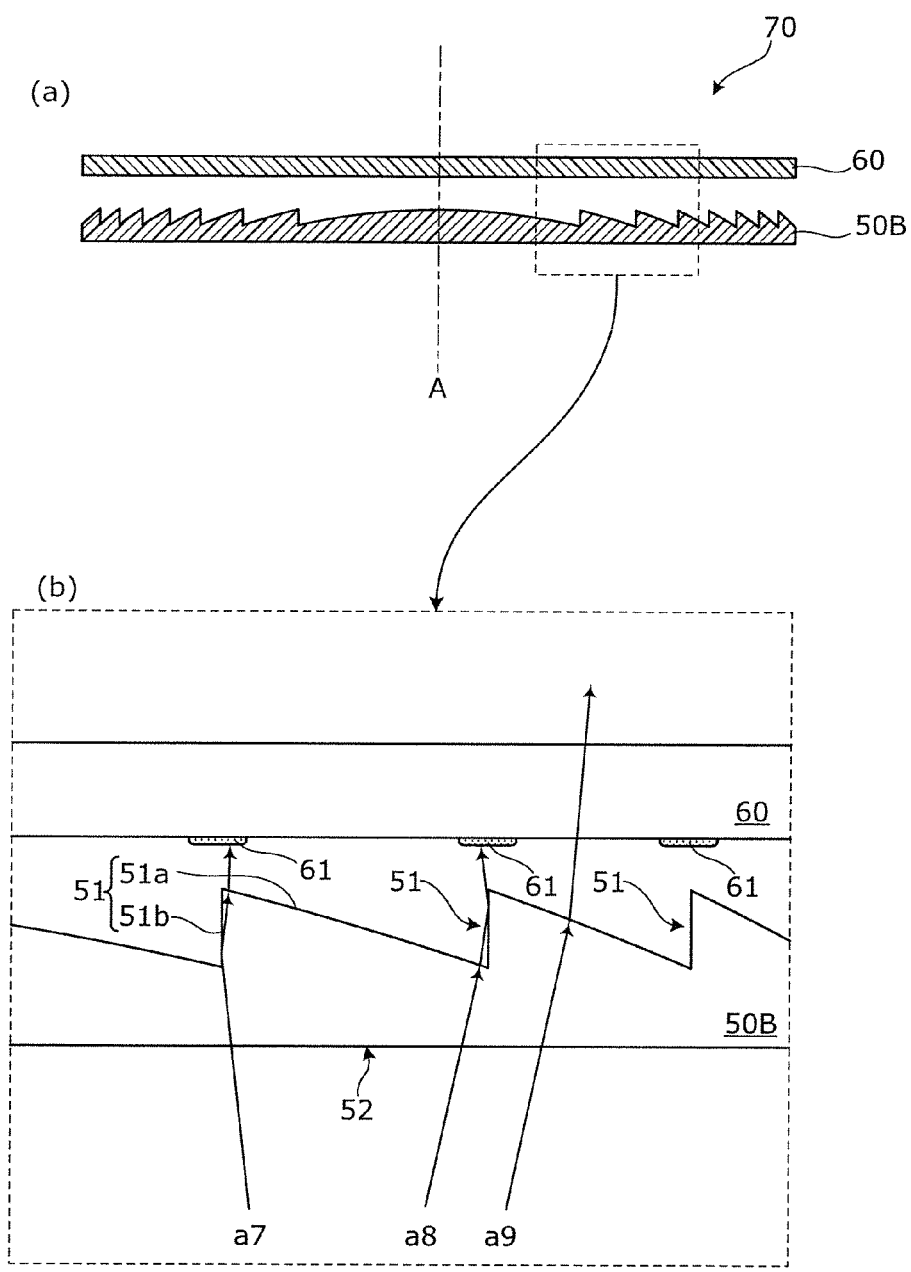
FIG. 9 is a sectional view corresponding to FIG. 7, showing a Fresnel lens in accordance with modified example 2 of the first exemplary embodiment.

Specific configuration of Fresnel lens unit 70 in accordance with the modified example 2 of the first exemplary embodiment is described with reference to FIG. 9. FIG. 9 is a sectional view corresponding to FIG. 7, showing Fresnel lens 50B in accordance with modified example 2 of the first exemplary embodiment. Note here that the configuration of Fresnel lens 50B is the same as the configuration of Fresnel lens 50 in accordance with the first exemplary embodiment except for light-shielding masks 53.

Fresnel lenses 50 and 50A of the first exemplary embodiment and the modified example 1 mentioned above have a configuration in which light-shielding masks 53 and 53A are provided on the surfaces of Fresnel lenses 50 and 50A, respectively; however, the configuration is not necessarily limited to this. A configuration in which Fresnel lens unit 70 having light-shielding masks 61 on transparent plate member 60 positioned on the optical axis of Fresnel lens 50B adjacent to Fresnel lens 50B may be employed. In other words, instead of Fresnel lenses 50 and 50A, Fresnel lens unit 70 including Fresnel lens 50B that does not have a light-shielding mask and plate member 60 having light-shielding masks 61 may be employed.

As shown in FIG. 9, Fresnel lens unit 70 includes Fresnel lens 50B that does not have a light-shielding mask, and includes transparent plate member 60.

Plate member 60 is a transparent plate member (substrate) disposed facing Fresnel lens 50B, and has light-shielding masks 61 at positions facing second surfaces 51*b* of Fresnel lens 50B. For example, as shown in (b) of FIG. 9, light-shielding masks 61 are formed on the surface at the incident side of plate member 60, and in regions in which light rays a7, a8 reflected by second surfaces 51*b* of Fresnel lens 50B strike the surface at the incident side of plate member 60. In other words, light-shielding masks 61 are formed in regions where light-shielding masks 61 prevent light rays a7, a8 reflected by second surface 51*b* of Fresnel lens 50B from being emitted from Fresnel lens unit 70. On the other hand, light-shielding mask 61 is not formed in a region, on the surface at the incident side of plate member 60, into which light ray a9 is emitted without being reflected by second surface 51*b* strike.

Note here that the regions provided with light-shielding masks 61 can be determined by an angle of light incident on Fresnel lens 50B, an angle at which the incident light is refracted by plane 52, an angle at which the light is reflected at second surface 51*b*, an angle at which the light is refracted at bumpy surface 51, and a shape of Fresnel lens 50B.

1-7. Modified Example 3 of First Exemplary Embodiment

In Fresnel lens 50 in accordance with the first exemplary embodiment mentioned above, although not particularly notified, light-shielding mask may have a shape as shown in FIG. 10.

FIG. 10 is a plan view of a Fresnel lens in accordance with modified example 3 of the first exemplary embodiment seen from a direction of the optical axis. In (a) of FIG. 10, a plan view of Fresnel lens 50C seen from the direction of the optical axis is indicated, and (b) of FIG. 10, an enlarged view of a part of (a) of FIG. 10 is indicated.

As shown in (b) of FIG. 10, the end part of a mask pattern of light-shielding mask 53C has a meandering shape. Specifically, the mask pattern of light-shielding mask 53C formed in a circular shape has a meandering shape at the end lines of the outer side and the inner side in the diameter direction.

In Fresnel lens 50 using light-shielding mask 53 of the first exemplary embodiment, since the incident light or emitted light is shielded by light-shielding masks 53, light is diffracted at the edge portion of the mask pattern of each of light-shielding masks 53, and slight stray light is generated. For an observer, the mask pattern appears to shine faintly. On the contrary, in light-shielding mask 53C of modified example 3 of the first exemplary embodiment, a direction in which stray light is diffracted can be made different depending on the angle at the end lines, and diffracted light can be distributed to a wide angle. Thus, diffracted light visually recognized by the observer can be reduced.

Note here that the shape of light-shielding mask 53C mentioned above may be applied to light-shielding masks 53A and 61 of Fresnel lens 50A and Fresnel lens unit 70 of the modified examples 1 and 2 of the first exemplary embodiment.

Second Exemplary Embodiment

Next, Fresnel lens 150 in accordance with the second exemplary embodiment is described.

While Fresnel lens 50, 50A and Fresnel lens unit 70 in accordance with the first exemplary embodiment and the modified examples thereof have a configuration in which light-shielding masks 53, 53A, and 61 are formed for shielding reflected light such that the reflected light, which is a cause of stray light, is not emitted at second surface 51b, the second exemplary embodiment has a configuration in which stray light is not blocked by light-shielding masks 53, 53A, or 61. Specifically, none of light-shielding masks 53, 53A, and 61 is provided.

2-1. Configuration of Fresnel Lens

Figure 11:
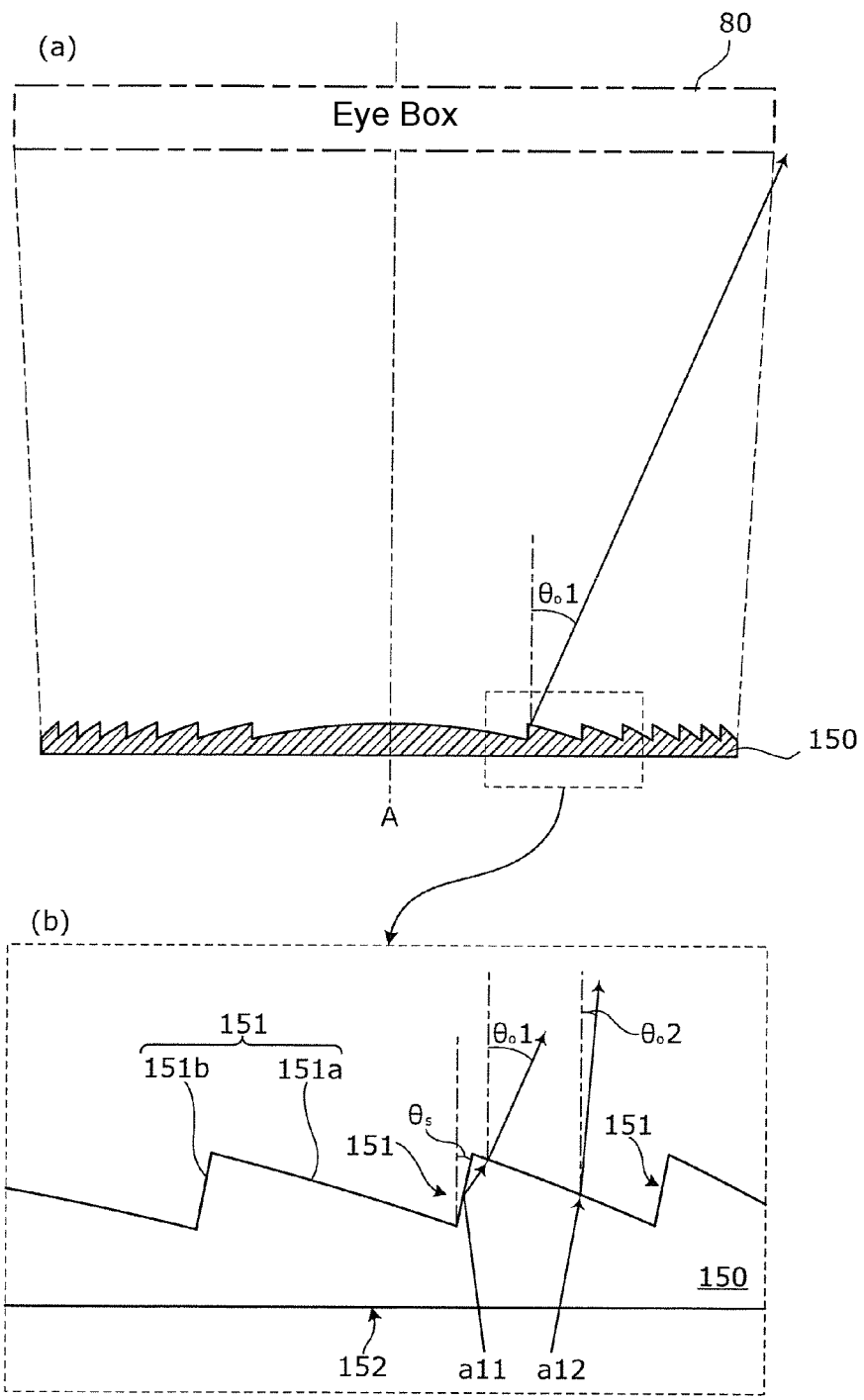
FIG. 11 is a sectional view corresponding to FIG. 7, showing a Fresnel lens in accordance with a second exemplary embodiment.

Specific configuration of Fresnel lens 150 in accordance with the second exemplary embodiment is described with reference to FIG. 11. FIG. 11 is a sectional view corresponding to FIG. 7, showing a Fresnel lens in accordance with the second exemplary embodiment.

As shown in FIG. 11, Fresnel lens 150 in accordance with the second exemplary embodiment includes plane 152 at a light-incident side, and sawtooth-shaped bumpy surface 151 at the light-emitting side. In other words, a reverse surface of Fresnel lens 150 from bumpy surface 151 is plane 152. Note here that Fresnel lens 150 is made of, for example, resin such as acrylic resin. Bumpy surface 151 of Fresnel lens 150 is formed in a form of concentric circles.

Each of first surfaces 151a is a light condensing surface that allows light incident on Fresnel lens 150 to converge toward a predetermined focal point. In other words, first surface 151a refracts the light incident on Fresnel lens 150 toward the predetermined focal point. Furthermore, first surfaces 151a are formed concentrically. In first surfaces 151a, the more inside (the closer to the optical axis A) first surface 151a is disposed, the larger the inclination angle of first surface 151a with respect to the optical axis A is.

Each of second surfaces 151b is a wall surface that does not allow light to converge toward the predetermined focal point. Second surface 151b is a wall surface configured to offset first surface 151a that is a light condensing surface, in order to reduce a thickness of a convex lens.

In a protrusion that is formed of first surface 151a and second surface 151b being adjacent to each other and protrudes toward the emitting side, first surface 151a is disposed outside second surface 151b.

Second surface 151b is inclined with respect to the optical axis A of Fresnel lens 150 at an angle to reflect incident light striking second surface 151b in a direction toward the outside of a range of eye box 80. Second surface 151b is inclined with respect to the optical axis A such that second surface 151b extends outward from the incident side to the emitting side. In other words, first surface 151a and second surface 151b are formed in respective regions which are not overlapped with each other seen from the optical axis A.

Furthermore, among second surfaces 151b that form bumpy surface 151, including a first wall surface and a second wall surface disposed outside the first wall surface, the second wall surface is inclined with respect to the optical axis greater than the first wall surface is.

Specifically, Fresnel lens 150 can be formed as follows.

Assuming a case in which a distance from driver 12 to image 8 as a virtual image is 2 m, a distance from driver 12 to the Fresnel lens is 1 m, a width of image 8 in the horizontal direction is 400 mm, and a width of eye box 80 in the horizontal direction is 130 mm. In this case, the width in the horizontal direction of Fresnel lens 150 is 270 mm, incident angle $\theta_{in}$ to Fresnel lens 150 is about ±4° in a portion in the vicinity of the optical axis A of Fresnel lens 150 and 4 to 12° at the end parts in the horizontal direction of Fresnel lens 150. At this time, when inclination angle $\theta_8$ of second surface 151b of Fresnel lens 150 is 4° or more in a portion in the vicinity of the optical axis A of Fresnel lens 150, and 12° or more at the end part in the horizontal direction of Fresnel lens 150, the light reflected by second surface 151b can be deviated to the out of the range of eye box 80.

2-2. Advantageous Effect

According to Fresnel lens 150 in accordance with the second exemplary embodiment, among the incident light, incident light ray a11, which is reflected by second surface 151b as a wall surface that does not allow light to converge toward the predetermined focal point, is emitted in a direction (at an emitting angle $\theta_o1$) toward outside of the range of eye box 80. Thus, incident light ray a11 can be prevented from being visually recognized by driver 12 as an observer. Furthermore, among the incident light, incident light ray a12 that is not reflected by the second surface 151a is emitted in a direction (at an emitting angle $\theta_o2$) of travelling to the inside of a range of eye box 80. Thus, incident light ray a12 can be visually recognized by driver 12. Therefore, it is possible to efficiently reduce driver's visual recognition of stray light that is caused by reflection by second surface 151a. As a result, it is possible to efficiently reduce the deterioration of the image displayed by head-up display 2.

2-3. Modified Example 1 of Second Exemplary Embodiment

Fresnel lens 150 in accordance with the second exemplary embodiment mentioned above has a configuration in which first surface 151a and second surface 151b are formed in the regions that are not overlapped with each other seen from the direction of optical axis A; however, the configuration is not necessarily limited to this.

Figure 12:
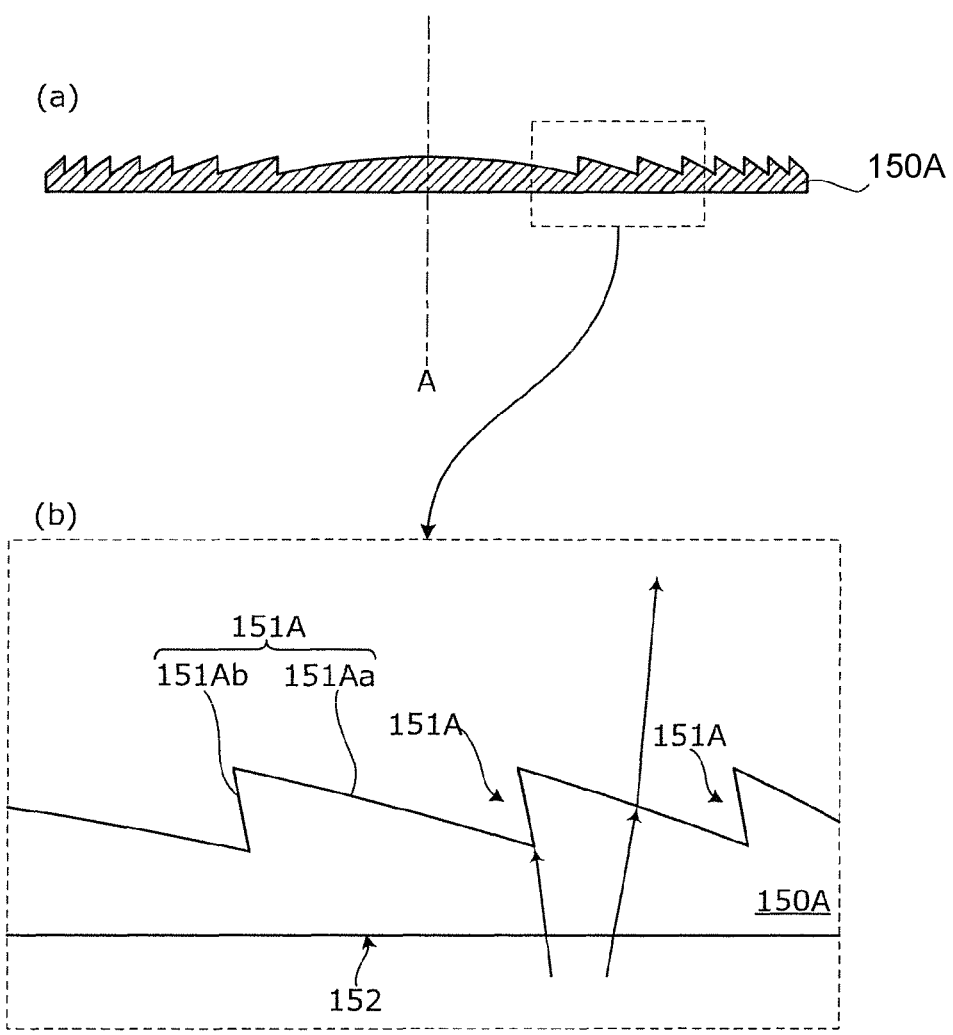
FIG. 12 is a sectional view corresponding to FIG. 7, showing a Fresnel lens in accordance with modified example 1 of the second exemplary embodiment.

Specific configuration of Fresnel lens 150A in accordance with modified example 1 of the second exemplary embodiment is described with reference to FIG. 12. FIG. 12 is a sectional view corresponding to FIG. 7, showing a Fresnel lens in accordance with modified example 1 of the second exemplary embodiment.

As shown in FIG. 12, Fresnel lens 150A is different from Fresnel lens 150 in the second exemplary embodiment in that first surface 151Aa and second surface 151Ab are overlapped onto each other seen from the direction of an optical axis. In other words, second surface 151Ab is inclined with respect to optical axis A of Fresnel lens 150A at an angle at which the incident light to Fresnel lens 150A does not directly strike the wall surface.

Thus, the incident light to Fresnel lens 150A can be prevented from directly being reflected by second surface 151Ab, and it is possible to efficiently reduce driver's visual recognition of stray light caused by reflection by second surface 151Aa. Therefore, it is possible to efficiently reduce the deterioration of the image displayed by head-up display 2.

Other Exemplary Embodiments

The head-up display in accordance with one or a plurality of aspects has been described based on the above-mentioned exemplary embodiments, but the present disclosure is not limited to the exemplary embodiments. Configurations in which various variations conceived by those skilled in the art are applied to the present exemplary embodiments, and configurations established by combining constituent elements in different exemplary embodiments or modified examples may also fall within the scope of one or more aspects, without departing from the gist of the present disclosure.

Note here that since a usual head-up display has a relatively small viewing angle such as 20° or less, the incident angle distribution of the light incident on a Fresnel lens is also relatively small, and the inclination angle of the wall surface can be also set at 20° or less. Therefore, light loss is small, and stray light by the reflected light can be effectively prevented. However, the present disclosure is not necessarily limited to this exemplary embodiment.

For example, in each of the above-mentioned exemplary embodiments, a case where head-up display 2 (2A) is mounted to automobile 4 has been described. However, the configuration is not necessarily limited to this, and head-up display 2 (2A) may be mounted on, for example, motorcycles, airplanes, trains, ships, or the like.

Furthermore, a case where head-up display 2 (2A) is mounted on a vehicle has been described; however, the configuration is not necessarily limited to this. Head-up display 2 (2A) may be mounted on, for example, glasses configured as wearable devices.

Note here that in the above-mentioned exemplary embodiments, the constituent elements may be implemented in special purpose hardware or with execution of software programs respectively suitable for those constituent elements. The constituent elements may be implemented by a program execution section, such as a CPU or a processor, reading and executing software programs stored in a recording medium, such as a hard disk or a semiconductor memory.

Furthermore, the following cases may be also included in the present disclosure.

(1) Specifically, the above-mentioned devices can be implemented using a computer system configured with a microprocessor, a read only memory (ROM), a read access memory (RAM), a hard disk unit, a display unit, a keyboard, a mouse, and the like. A computer program is stored in the RAM or the hard disk unit. The microprocessor operates according to the computer program, and therefore the devices achieve the respective functions. Herein, the computer program is configured by combining a plurality of instruction codes that indicate instructions to a computer, in order to achieve predetermined functions.

(2) A part or all of the constituent elements configuring the above-mentioned devices may be configured with a single system large-scale-integration (LSI). The system LSI is a super multi-functional LSI manufactured such that a plurality of constituent units is integrated into a single chip, and specifically, is a computer system including the microprocessor, the ROM, the RAM, and the like. The ROM stores the computer program. The microprocessor loads the computer program from the ROM to the RAM, and performs operation such as computation according to the loaded computer program, and thus the system LSI achieves its functions.

(3) A part or all of the constituent elements configuring the above-mentioned devices may be configured with an integrated circuit (IC) card detachable from each of the devices, or a single module. The IC card or the module is the computer system configured with the microprocessor, the ROM, the RAM, and the like. The IC card or the module may include the above-mentioned super multi-functional LSI. The microprocessor operates according to the computer program, and thereby, the IC card or the module achieves its functions. The IC card or the module may have tamper resistance.

(4) The present disclosure may be implemented by using the above-mentioned methods. Those methods may be implemented by using the computer program that is implemented by the computer, or may be implemented by using digital signals according to the computer program.

Furthermore, the present disclosure may be implemented by using a configuration that stores the computer program or the digital signals in a computer-readable recording medium such as a flexible disk, a hard disk, a compact disc (CD)-ROM, a magneto-optical disc (MO), a digital versatile disc (DVD), a DVD-ROM, a DVD-RAM, a Blu-ray (registered trademark) disc (BD), and a semiconductor memory. In addition, the present disclosure may be implemented by using the digital signals stored in those recording media.

Furthermore, the present disclosure may transmit the computer program or the digital signals via a network represented by a telecommunications line, a wireless or wired communication line, and the Internet, data broadcasting, and the like.

Furthermore, the present disclosure may be the computer system including the microprocessor and the memory. The memory may store the computer program, and the microprocessor may operate according to the computer program.

Furthermore, the program or the digital signals may be executed by the other independent computer system, by recording and transporting the program or the digital signals to the other computer, or by transporting the program or the digital signals to the other computer via networks and the like.

(5) The above-mentioned exemplary embodiments and the above-mentioned modified examples may be combined.

A head-up display according to the present disclosure is applicable to, for example, a head-up display to be mounted on a vehicle.

What is claimed is:

1. A head-up display comprising an optical system that radiates light forming a projected image toward an eye box, the eye box being a predetermined range in which eyes of an observer are assumed to be present,
wherein the optical system includes a Fresnel lens having a bumpy surface having a sawtooth-shaped cross-section, the bumpy surface being formed concentrically around an optical axis, and formed by alternately disposing light condensing surfaces that allow incident light to converge toward a focal point, and wall surfaces that do not allow the incident light to converge toward the focal point, and
each of the wall surfaces is inclined with respect to the optical axis of the Fresnel lens at an angle to reflect the incident light striking each of the wall surfaces, in a direction toward outside of a range of the eye box.

2. The head-up display according to claim 1, wherein the wall surfaces includes a first wall surface and a second wall surface disposed more outside than the first wall surface, an inclination of the second wall surface with respect to the optical axis is larger than an inclination of the first wall surface with respect to the optical axis.

3. The head-up display according to claim 1, further comprising:
- a light source that emits light;
- a scanner that performs scanning with the light from the light source; and
- a screen through which light from the scanner passes to form an image on the screen,
- wherein the optical system displays, in space, a virtual image of the image formed on the screen.

4. A head-up display comprising an optical system that radiates light forming a projected image toward an eye box, the eye box being a predetermined range in which eyes of an observer are assumed to be present,
- wherein the optical system includes a Fresnel lens having a bumpy surface having a sawtooth-shaped cross-section, the bumpy surface being formed concentrically around an optical axis, and formed by alternately disposing light condensing surfaces that allow incident light to converge to a focal point, and wall surfaces that do not allow the incident light to converge toward the focal point, and
- each of the wall surfaces is inclined with respect to the optical axis of the Fresnel lens at an angle such that the incident light on the Fresnel lens does not directly strike each of the wall surfaces.

5. The head-up display according to claim 4, wherein the light condensing surfaces and the wall surfaces are respectively disposed to be overlapped with each other in a direction of the optical axis.

* * * * *